US008578360B1

(12) United States Patent
Nallagatla et al.

(10) Patent No.: US 8,578,360 B1
(45) Date of Patent: *Nov. 5, 2013

(54) DYNAMICALLY UPDATING A COMPUTER SYSTEM AND FIRMWARE IMAGE UTILIZING AN OPTION READ ONLY MEMORY (OPROM) DATA STRUCTURE

(75) Inventors: Purandhar Nallagatla, Duluth, GA (US); Harikrishna Doppalapudi, Tenali (IN)

(73) Assignee: American Megatrends, Inc., Norcross, GA (US)

( * ) Notice: Subject to any disclaimer, the term of this patent is extended or adjusted under 35 U.S.C. 154(b) by 442 days.

This patent is subject to a terminal disclaimer.

(21) Appl. No.: 12/849,347

(22) Filed: Aug. 3, 2010

Related U.S. Application Data

(63) Continuation of application No. 11/479,923, filed on Jun. 30, 2006, now Pat. No. 7,797,696.

(51) Int. Cl.
*G06F 9/44* (2006.01)
*G06F 9/45* (2006.01)

(52) U.S. Cl.
USPC ............................ 717/168; 717/169; 717/170

(58) Field of Classification Search
USPC ........................... 717/168–174; 709/203–204
See application file for complete search history.

(56) References Cited

U.S. PATENT DOCUMENTS

| 5,210,854 | A | 5/1993 | Beaverton et al. |
| 5,623,604 | A | 4/1997 | Russell et al. |
| 6,081,850 | A | 6/2000 | Garney |
| 6,253,300 | B1 | 6/2001 | Lawrence et al. |
| 6,360,362 | B1 | 3/2002 | Fichtner et al. |
| 6,581,157 | B1 | 6/2003 | Chiles et al. |
| 6,604,236 | B1 | 8/2003 | Draper et al. |
| 6,631,520 | B1 | 10/2003 | Theron et al. |
| 6,640,334 | B1 | 10/2003 | Rsamussen |
| 6,678,741 | B1 | 1/2004 | Northcutt et al. |
| 6,836,885 | B1 * | 12/2004 | Buswell et al. ............... 717/172 |
| 6,898,768 | B1 | 5/2005 | Theodossy et al. |
| 6,944,854 | B2 | 9/2005 | Kehne et al. |
| 6,954,929 | B2 | 10/2005 | Erikson et al. |
| 6,976,163 | B1 | 12/2005 | Hind et al. |
| 7,007,159 | B2 | 2/2006 | Wyatt |
| 7,055,148 | B2 | 5/2006 | Marsh et al. |

(Continued)

OTHER PUBLICATIONS

Aroya et al, "Competitive analysis of flash memory algorithms", ACM Trans. on Algorithms, vol. 7, article 2, pp. 1-23, 2011.*

(Continued)

*Primary Examiner* — Anil Khatri
(74) *Attorney, Agent, or Firm* — Hope Baldauff, LLC (57) ABSTRACT

Methods, systems, apparatus, and computer-readable media for dynamically updating a computer system and firmware image utilizing an option ROM ("OPROM") data structure. When a hardware configuration of a computer system is modified, a corresponding OPROM within the firmware image is modified. An OPROM data structure is created in a firmware image. Each data structure contains identification data corresponding to the data structure as well as an OPROM entry for each OPROM within the firmware image. Each OPROM entry has identification data pointing to the corresponding OPROM and identification data corresponding to the OPROM and associated hardware device. Firmware program modules utilize the OPROM data structure to identify the correct OPROMs for use with the computer system hardware configuration. An application searches for a unique signature associated with the OPROM data structure and modifies OPROM entries as hardware devices and associated OPROMs are added to and removed from the computer system.

19 Claims, 3 Drawing Sheets

(56) References Cited

U.S. PATENT DOCUMENTS

| | | | |
|---|---|---|---|
| 7,069,452 B1 | 6/2006 | Hind et al. | |
| 7,089,547 B2 | 8/2006 | Goodman et al. | |
| 7,127,599 B2 | 10/2006 | Brice et al. | |
| 7,146,609 B2 * | 12/2006 | Thurston et al. | 717/169 |
| 7,171,658 B2 | 1/2007 | Ha | |
| 7,178,141 B2 * | 2/2007 | Piazza | 717/168 |
| 7,203,723 B2 | 4/2007 | Ogawa | |
| 7,243,347 B2 * | 7/2007 | Palmer et al. | 717/170 |
| 7,284,085 B2 | 10/2007 | Netter et al. | |
| 7,299,463 B2 | 11/2007 | Brannock et al. | |
| 7,305,668 B2 * | 12/2007 | Kennedy et al. | 717/168 |
| 7,313,685 B2 | 12/2007 | Broyles et al. | |
| 7,337,309 B2 | 2/2008 | Nguyen et al. | |
| 7,373,432 B2 | 5/2008 | Rapp et al. | |
| 7,376,943 B2 * | 5/2008 | Lu | 717/168 |
| 7,376,944 B2 | 5/2008 | Crisan et al. | |
| 7,409,685 B2 * | 8/2008 | Chen et al. | 717/170 |
| 7,421,688 B1 * | 9/2008 | Righi et al. | 717/172 |
| 7,480,907 B1 * | 1/2009 | Marolia et al. | 717/174 |
| 7,543,048 B2 | 6/2009 | Rothman et al. | |
| 7,555,750 B1 * | 6/2009 | Lilley | 717/168 |
| 7,558,867 B2 * | 7/2009 | Le et al. | 709/230 |
| 7,590,835 B1 | 9/2009 | Nallagatla et al. | |
| 7,657,886 B1 * | 2/2010 | Chen et al. | 717/170 |
| 7,774,596 B2 | 8/2010 | Flynn | |
| 7,797,696 B1 | 9/2010 | Nallagatla et al. | |
| 7,814,474 B2 * | 10/2010 | Chen et al. | 717/168 |
| 8,032,881 B2 * | 10/2011 | Holmberg et al. | 717/171 |
| 8,037,198 B2 * | 10/2011 | Le et al. | 709/230 |
| 8,136,108 B2 * | 3/2012 | Ha et al. | 717/168 |
| 8,229,227 B2 * | 7/2012 | Stojancic et al. | 382/190 |
| 8,261,256 B1 * | 9/2012 | Adler et al. | 717/173 |
| 2001/0042243 A1 | 11/2001 | Fish et al. | |
| 2003/0145008 A1 | 7/2003 | Burrell | |
| 2003/0217193 A1 | 11/2003 | Thurston et al. | |
| 2004/0030875 A1 | 2/2004 | Qureshi et al. | |
| 2004/0158828 A1 | 8/2004 | Zimmer et al. | |
| 2004/0162975 A1 | 8/2004 | Yakovlev | |
| 2004/0162976 A1 | 8/2004 | Yakovlev | |
| 2005/0108700 A1 | 5/2005 | Chen et al. | |
| 2005/0120384 A1 | 6/2005 | Stone et al. | |
| 2006/0122945 A1 | 6/2006 | Ripberger et al. | |
| 2007/0055794 A1 | 3/2007 | Chuang et al. | |
| 2007/0214453 A1 | 9/2007 | Dive-Reclus | |
| 2007/0274230 A1 | 11/2007 | Werber et al. | |

OTHER PUBLICATIONS

Chen et al, "Understanding intrinsic characterstics and system implictaion of flash memory based solid state drives", ACM, pp. 181-192, 2009.*

Bencsath et al, "XCS based hidden firmware modifiction on embedded devices", IEEE, pp. 1-5, 2011.*

Dong et al, "FEMU A firmware based emulation framework for SoC verification" ACM, pp. 257-266, 2010.*

U.S. Official Action dated Dec. 1, 2010 in U.S. Appl. No. 11/478,981.

U.S. Official Action dated Feb. 27, 2012 in U.S. Appl. No. 11/478,981, filed Jun. 30, 2006, First Named Inventor: Purandhar Nallagatla.

U.S. Official Action dated Aug. 13, 2012 in U.S. Appl. No. 12/539,132, filed Aug. 11, 2009, First Named Inventor: Purandhar Nallagatla.

U.S. Official Action dated May 11, 2011 in U.S. Appl. No. 11/478,981, filed Jun. 30, 2006, First Named Inventor: Purandhar Nallagatla.

U.S. Official Action dated Feb. 4, 2013 in U.S. Appl. No. 12/539,132, filed Aug. 11, 2009, First Named Inventor: Purandhar Nallagatla.

U.S. Official Action dated Dec. 5, 2012 in U.S. Appl. No. 11/478,981, filed Jun. 30, 2006, First Named Inventor: Purandhar Nallagatla.

U.S. Appl. No. 11/479,725, filed Jun. 30, 2006, entitled "Dynamically Updating a Computer System Firmware Image," Inventors: Nallagatla et al.

U.S. Appl. No. 12/539,132, filed Aug. 11, 2009, entitled "Dynamically Updating a Computer System Firmware Image," Inventors: Nallagatla et al.

U.S. Appl. No. 11/478,981, filed Jun. 30, 2006, entitled "Uniquely Identifying and Validating Computer System Firmware," Inventors: Nallagatla et al.

U.S. Official Action dated Jan. 2, 2009 in U.S. Appl. No. 11/479,725.

U.S. Notice of Allowance / Allowability dated May 19, 2009 in U.S. Appl. No. 11/479,725.

U.S. Official Action dated Nov. 25, 2009 in U.S. Appl. No. 11/479,923.

U.S. Notice of Allowance / Allowability dated May 4, 2010 in U.S. Appl. No. 11/479,923.

Cieslicki et al., "Efficient updates in highly available distributed random access memory," 2006, IEEE, ICPADS, pp. 1-6.

Kim et al., "Remoate progressive firmware update for flash based networked embedded systems," 2009, ACM ISLPED, pp. 407-412.

Kumar et al., "Dynamic memory management for programmable devices," 2002, ACM ISMM, pp. 139-149.

Tiwari et al., "A small cache of large ranges: Hardware methods for efficiently searching, storing and updating big dataflow tags," 2008, IEEE, pp. 94-105.

U.S. Official Action dated Aug. 2, 2013 in U.S. Appl. No. 11/478,981, filed Jun. 30, 2006, First Named Inventor: Purandhar Nallagatla.

U.S. Notice of Allowance/Allowability dated May 24, 2013 in U.S. Appl. No. 12/539,132, filed Aug. 11, 2009, First Named Inventor: Purandhar Nallagatla.

* cited by examiner

DYNAMICALLY UPDATING A COMPUTER SYSTEM AND FIRMWARE IMAGE UTILIZING AN OPTION READ ONLY MEMORY (OPROM) DATA STRUCTURE

CROSS-REFERENCE TO RELATED APPLICATIONS

This application is a continuation of U.S. patent application Ser. No. 11/479,923, filed on Jun. 30, 2006 now U.S. Pat. No. 7,797,696 and entitled "Dynamically Updating a Computer System and Firmware Image Utilizing an Option Read Only Memory (OPROM) Data Structure," now U.S. Pat. No. 7,797,696, issued Sep. 14, 2010, which is incorporated herein by reference in its entirety.

This application is also related to U.S. patent application Ser. No. 11/478,981, filed on Jun. 30, 2006 and entitled "Uniquely Identifying and Validating Computer System Firmware," and U.S. Pat. No. 7,590,835, filed on Jun. 30, 2006 and entitled "Dynamically Updating a Computer System Firmware Image," which are both expressly incorporated herein by reference in their entirety.

BACKGROUND

Circuit board manufacturers design motherboards or other circuit boards that will support various combinations of hardware devices, independent of any specific model or chipset vendor. For example, a manufacturer of computer system motherboards may include circuitry that will generally support network components, but the manufacturer does not design the motherboards for specific network components from particular vendors or provide firmware to support vendor-specific components. Each particular vendor will each receive the original motherboard configuration from the manufacturer and then reconfigure the motherboard for their specific proprietary components.

Computing systems often utilize firmware that is stored in a non-volatile memory device, such as a read-only memory ("ROM") device or a non-volatile random access memory ("NVRAM") device. The firmware provides program code for performing power-on self tests, booting, and for providing support to the operating system and various hardware devices within the computer system. As with the original computer system motherboard, the firmware that supports the original motherboard is not designed to support specific hardware from a particular vendor. When hardware devices such as chipsets are added or removed from a computer system by a vendor or other party, then one or more program modules, or "option ROMs," within the firmware often must be added or removed to provide support for the vendor-specific device. A customized firmware image is created by the firmware developer and provided to the vendor for flashing into a memory device and distribution with the customized motherboard. This firmware customization process consumes time and resources.

It is with respect to these considerations and others that the various embodiments of the invention have been made.

SUMMARY

In accordance with present embodiments described herein, the above and other problems are solved by methods, apparatus, systems, and computer-readable media for dynamically updating a computer system and computer system firmware image utilizing an option ROM data structure. Through the embodiments, an option ROM ("OPROM") data structure contains information identifying each OPROM associated with a hardware device installed on the motherboard of a computer system. This information may be modified as the hardware configuration of the motherboard is modified and corresponding OPROMs are added and removed to and from the firmware image according to the configuration change. The OPROM data structure includes data structure identifiers that allow the firmware program modules and external applications to search for and locate the OPROM data structure.

According to implementations described herein, a method is provided for dynamically updating a computer system firmware image. According to the method, an OPROM corresponding to a hardware device is modified. The modification may be adding or deleting the OPROM depending on whether a corresponding hardware device is added or removed from a computer system motherboard. A firmware image for the computer system is searched for a data structure signature associated with an OPROM data structure. The OPROM data structure has a number of stored OPROM identifiers corresponding to hardware devices within the computer system. The OPROM data structure identified by the data structure signature is retrieved, and an OPROM identifier within the OPROM data structure is modified. The OPROM identifier includes a pointer that identifies the location of the modified OPROM.

According to another implementation described herein, a method for dynamically updating a computer system and computer system firmware is provided. A hardware device is installed within the computer system. A determination is made as to whether an OPROM corresponding to the hardware device is present within the computer system. If the OPROM is not present within the computer system, then the OPROM is stored within the computer system firmware image. The firmware image is searched for a data structure signature associated with an OPROM data structure. The OPROM data structure has a number of stored OPROM identifiers corresponding to hardware devices within the computer system. The OPROM data structure identified by the data structure signature is retrieved, and an OPROM identifier corresponding to the installed hardware device is stored within the OPROM data structure.

According to yet another implementation, a memory for storing a firmware image for creating a computer system firmware is provided. The firmware image includes an OPROM corresponding to a hardware device associated with the computer system. The firmware image further includes an OPROM data structure with an array of data fields. The data fields are populated by a data structure signature that identifies the OPROM data structure, an OPROM identifier that has identifying information relating to the OPROM, and a pointer identifying the location of the OPROM.

Aspects of the invention may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the disclosure presented herein, will be apparent from a reading of the following detailed description and a review of the associated drawings.

DETAILED DESCRIPTION

Embodiments of the present invention provide methods, apparatus, systems, and computer-readable media for updating a computer system and updating the computer system firmware image using an option ROM ("OPROM"). According to implementations described herein, a firmware image includes one or more firmware program modules, or OPROMs, and one or more OPROM data structures. An OPROM is a firmware program module that is used to support the functionality of a hardware device in the computer system once the OPROM is loaded.

Anytime a hardware device is added or removed from the computer system, at least one corresponding OPROM may be added or removed from the computer system. Doing so allows the core firmware program modules to identify the proper OPROMs corresponding to the updated hardware configuration in order to properly support the installed hardware devices. OPROMs may be stored within the firmware image or may reside with a corresponding hardware device on an expansion card. Hardware devices that are mounted on the computer system motherboard require corresponding OPROMs to be stored in the computer system firmware image to be stored in a non-volatile memory of the computer system.

According to the disclosure presented herein, the OPROM data structure provides pointers to each OPROM within the firmware image along with various identification data relating to each OPROM and corresponding hardware devices. Core firmware program modules identify the OPROMs using the information and pointers stored within the OPROM data structure. Additionally, an application may be used to search for the OPROM data structure and modify its contents as OPROMs are added and deleted to and from the firmware image. These structures and processes will be described in detail below with respect to FIGS. 2 and 3. In the following detailed description, references are made to the accompanying drawings that form a part hereof, and in which are shown by way of illustration specific embodiments or examples. Referring now to the drawings, in which like numerals represent like elements throughout the several figures, the exemplary operating environment and several illustrative implementations will be described.

Figure 1:
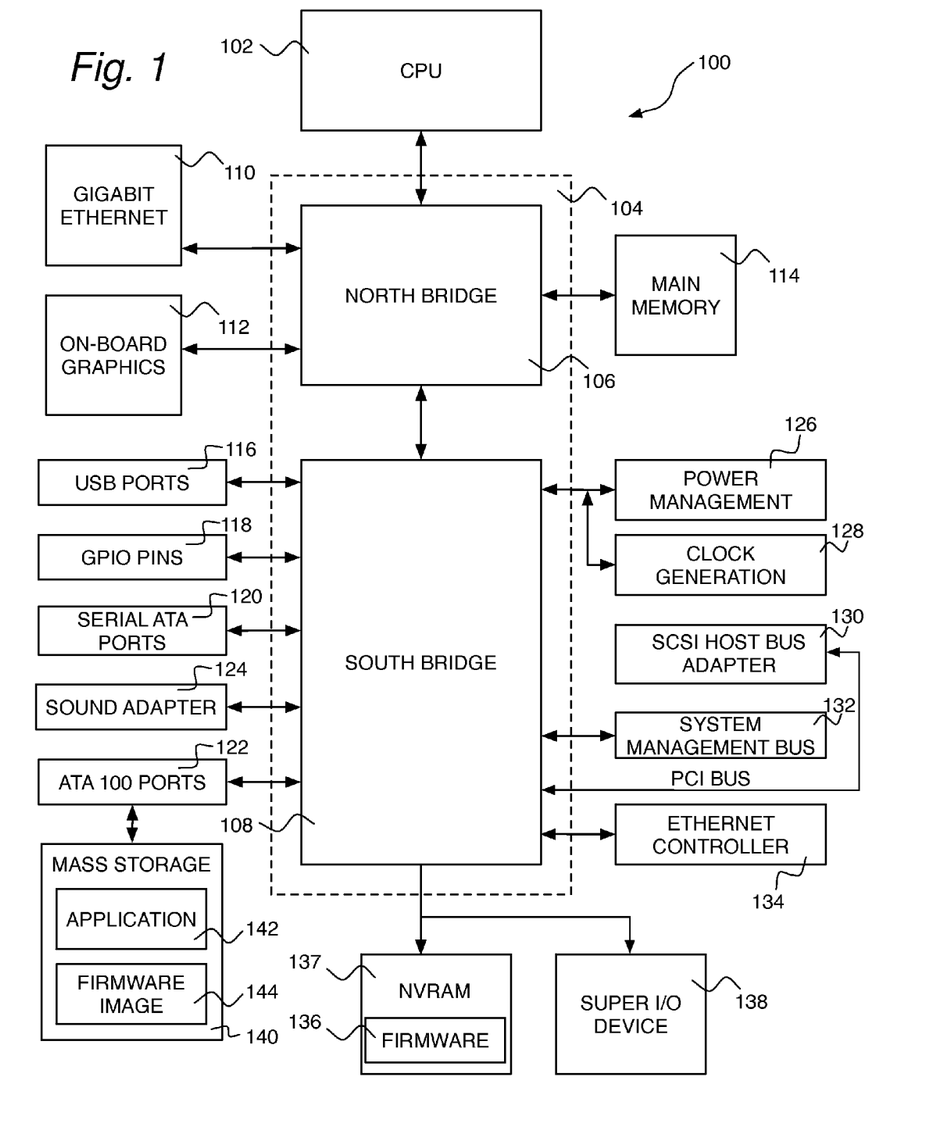
FIG. 1 is a computer architecture diagram that illustrates various components of a computer that provides an illustrative operating environment.

FIG. 1 and the following discussion are intended to provide a brief, general description of a suitable computing environment in which the disclosure presented herein may be implemented. While the embodiments described herein will be described in the general context of program modules that execute in conjunction with the execution of a computer firmware, those skilled in the art will recognize that they may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the disclosure presented herein will be described. It should be appreciated that although the embodiments described herein are discussed in the context of a conventional desktop or server computer, the embodiments may be utilized with virtually any type of computing device. FIG. 1 shows an illustrative computer architecture for a computer 100 that is operative to enable the creation of an OPROM data structure that may be used to update the computer system firmware image. In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices 140. Mass storage device 140 may store an operating system, application programs, and a firmware image.

As known to those skilled in the art, an operating system comprises a set of programs that control operations of a computer and allocation of resources. An application program is software that runs on top of the operating system software and uses computer resources made available through the operating system to perform application specific tasks desired by the user. A firmware image is firmware data that is written, or flashed, to a programmable non-volatile memory device, such as NVRAM 137. According to an embodiment described below, mass storage device 140 stores an application program 142 and a firmware image 144. As will be described in greater detail below, the application program 142 is used to search the firmware image 144 for a unique signature that identifies an OPROM data structure that contains OPROM identification data pointing to each OPROM within the firmware image.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The firmware 136 may comprise a firmware that is compatible with the Extensible Firmware Interface ("EFI") specification. The firmware 136 may also comprise a Basic Input/Output System ("BIOS") firmware. The LPC interface may also be utilized to connect a NVRAM 137 to the computer 100. In one embodiment, the NVRAM 137 may also be utilized by the firmware 136 to store configuration data and other kinds of data for the computer 100. It should be appreciated that the configuration and other data for the computer 100 may be stored on the same NVRAM device as the firmware 136. It should also be appreciated that the firmware 136 may be stored on ROM or other non-volatile memory device.

According to an embodiment described herein, the CPU 102 may comprise a general purpose microprocessor from INTEL CORPORATION. For instance, the CPU 102 may comprise a PENTIUM 4 or XEON microprocessor from INTEL CORPORATION. It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
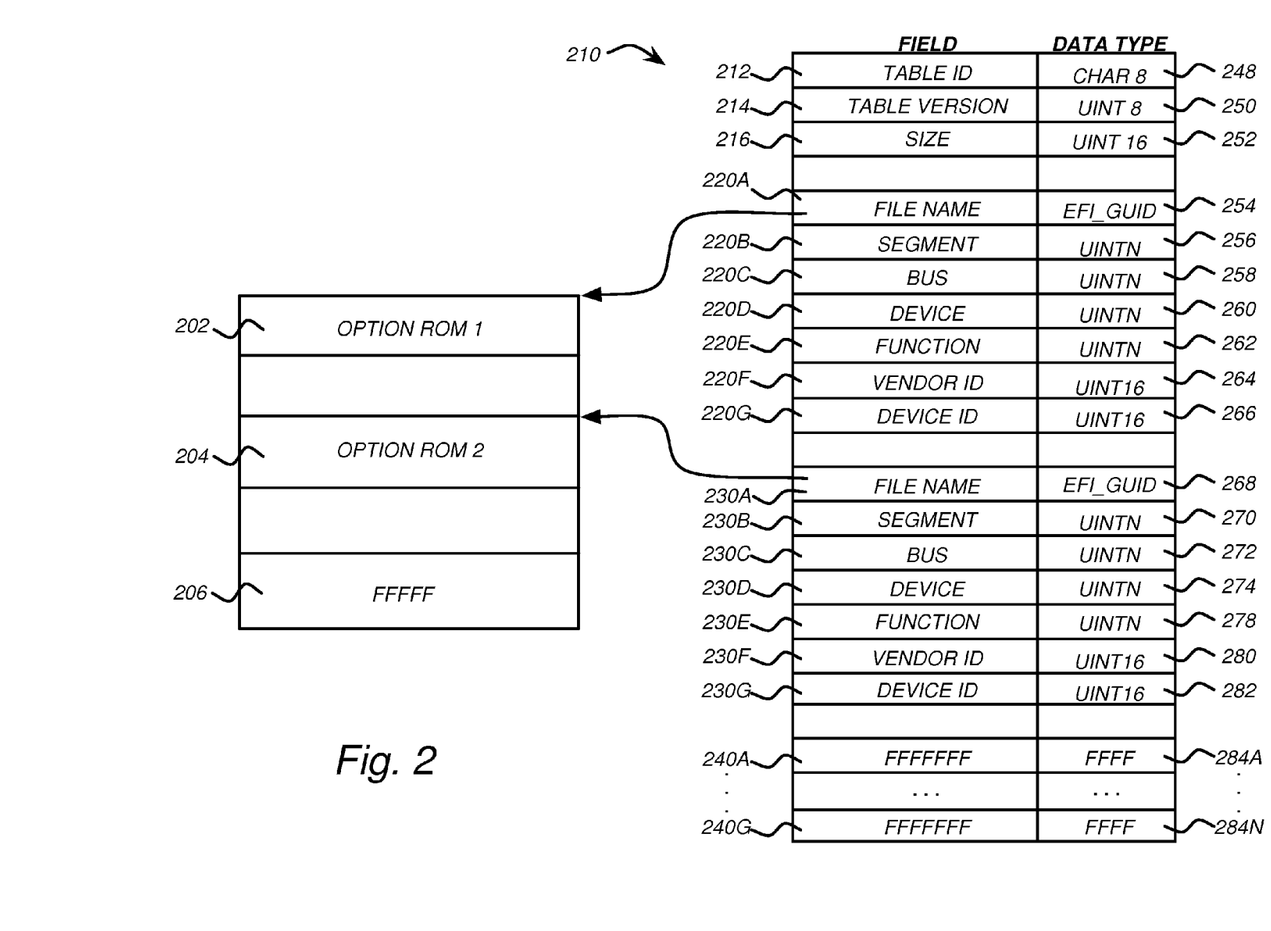
FIG. 2 is a block diagram illustrating OPROMs and an OPROM data structure within a computer system firmware image according to one embodiment.

Referring now to FIG. 2, additional details will be provided regarding the embodiments for customizing a computer system and updating a computer system firmware image. In particular, FIG. 2 is a block diagram illustrating various firmware image components, including the OPROMs 202 and 204 and an OPROM data structure 210. As described briefly above, each hardware device located on the computer system motherboard may have a corresponding OPROM. For simplicity purposes, only two OPROMs, 202 and 204, are shown in FIG. 2; however, it should be understood that the firmware image 144 may consist of any number of OPROMs depending on the specific hardware configuration of the motherboard. Each OPROM 202 and 204 consists of a collection of routines and data structures that performs a particular task. Each OPROM has at least one interface that lists the constants, data types, variables, and routines that can be accessed by other firmware program modules or routines, as well as an implementation that is private and contains the code that implements the routines in the OPROM. The firmware image 144 may contain one or more dummy entries 206 to be replaced by an OPROM when a corresponding hardware device is installed.

According to implementations described herein, firmware image 144 also includes an OPROM data structure 210. TABLE 1 shows program code for implementing an OPROM data structure similar to the OPROM data structure 210 shown in FIG. 2. The program code defines data fields for storing a data structure signature, a data structure version identifier, a name string, a data structure size indicator, and OPROM entries, all of which will be described in detail with respect to the OPROM data structure 210.

TABLE 1

```
typedef struct{
   CHAR8           TableID[4]; //Signature '$POT'
   UINT8           TableVersion; //Version of the table
   UINT16          Size; //Size of the table
   DEVICE_INFO DeviceInformation [NUM_OF_DEVICES];//Each
   device info
} PCI_OPTION_ROM_TABLE;
typedef struct {
   EFI_GUID        FileName;
   UINTN           Segment;
   UINTN           Bus;
   UINTN           Device;
   UINTN           Function;
   UINT16          Vendor ID;
   UINT16          DeviceID;
} DEVICE_INFO
```

Returning to FIG. 2, the OPROM data structure 210 contains identification data stored in data fields 212-216 corresponding to the OPROM data structure. The OPROM data structure 210 additionally contains two OPROM entries, 220 and 230. The OPROM entry 220 includes data fields 220A-220G corresponding to the OPROM 202. Similarly, the OPROM entry 230 includes data fields 230A-230G corresponding to the OPROM 204. It should be appreciated that the number of OPROM entries corresponds to the number of OPROMs stored within the firmware image 144. The OPROM data structure 210 may contain one or more dummy entries to be replaced by OPROM entries as a corresponding hardware device is installed and OPROM is stored in the firmware image 144. As an example, if a new hardware device is installed on the computer system motherboard, then the dummy OPROM entry 206 will be replaced with an OPROM corresponding to the new hardware device. However, the core firmware program modules need to be able to locate the new OPROM. Therefore, a new OPROM entry will be stored within the OPROM data structure 210 in data fields 240A-240G, replacing the dummy OPROM entry 240. Indicators that identify the type of data entered into data fields 212-240G are stored within data fields 248-284N of the OPROM data structure 210.

As stated above, the OPROM data structure 210 includes identification data corresponding to the OPROM data structure stored in data fields 212-216. Data field 212 stores a signature of the OPROM data structure 210. This signature may be used by an application 142 in searching for the OPROM data structure 210. To continue the example given above, when a vendor adds a proprietary chip to a computer system motherboard, an OPROM is added to the computer system firmware image 144 in place of the dummy entry 206. An application 142 is then used to search for a unique signature stored in data field 212 of the OPROM data structure 210. As an example, the signature of an OPROM data structure created using the code of TABLE 1 is "$POT." It should be understood that any unique identifiers, including globally unique identifiers ("GUIDs"), may be used for searching and locating an OPROM data structure. The new OPROM data entry is then stored in data fields 240A-240G, replacing the dummy entry 240.

The OPROM data structure 210 may also contain a structure version identifier stored in data field 214 that identifies the version of the OPROM data structure. This structure version identifier stored in field 214 is updated when the OPROM data structure 210 is updated. The OPROM data structure 210 may additionally include data stored in a field 216 that defines the size of the OPROM data structure. Data fields 220A-220G store an OPROM entry corresponding to the OPROM 202. The OPROM entry includes an identifier stored in data field 220A. The OPROM identifier may be a GUID and acts as a pointer to identify the particular OPROM to which the OPROM entry describes. It should be understood that the OPROM data structure 210 may include any specific data that acts as a pointer that sends the requesting application or module to the corresponding OPROM, or may simply include any amount and type of identification data that may be used to identify the location of the corresponding OPROM. As mentioned above, the core program modules of the computer system firmware that was created from the firmware image 144 refer to the OPROM data structure 210 to identify the applicable OPROMs corresponding to the installed hardware devices. As seen in FIG. 2, the OPROM identifier stored in data field 220A points to the OPROM 202.

Each OPROM entry stored within the OPROM data structure 210 may include a segment and bus number for the corresponding hardware device stored in data fields 220B and 220C, respectively. Each OPROM entry may also include a device and function number of the corresponding hardware device in host computer system stored in data fields 220D and 220E, respectively. Additionally, the OPROM entry may have vendor and device identification stored in data fields 220F and 220G, respectively, in order to identify the specific vendor of the hardware device as well as the name or vendor identification of the hardware device. The OPROM data structure 210 contains a second OPROM entry corresponding to the OPROM 204. The second OPROM entry has an OPROM identifier, segment number, bus number, device number, function number, and vendor and device IDs stored in data fields 230A-230G. As can be seen in FIG. 2, the OPROM identifier stored in data field 230A points to the OPROM 204, allowing core program modules to identify the OPROM corresponding with the associated hardware device.

As discussed above, data fields 240A-240G represent a dummy OPROM entry. Should an additional hardware device be installed onto the computer system motherboard, a corresponding OPROM may be stored in data field 206, while the associated OPROM entry within the OPROM data structure 210 may be stored in data fields 240A-240G. It should be appreciated that the OPROM data structure 210 may include any number of data fields for storing any amount and type of data in any format and order that may be pertinent to an application 142 searching the data structure or to a firmware program module utilizing the data. It should also be appreciated that the OPROM data structure 210 may be built into a separate section of the firmware image 144, so as to be accessible to the external application 142 capable of searching for and modifying the OPROM data structure 210.

Figure 3:
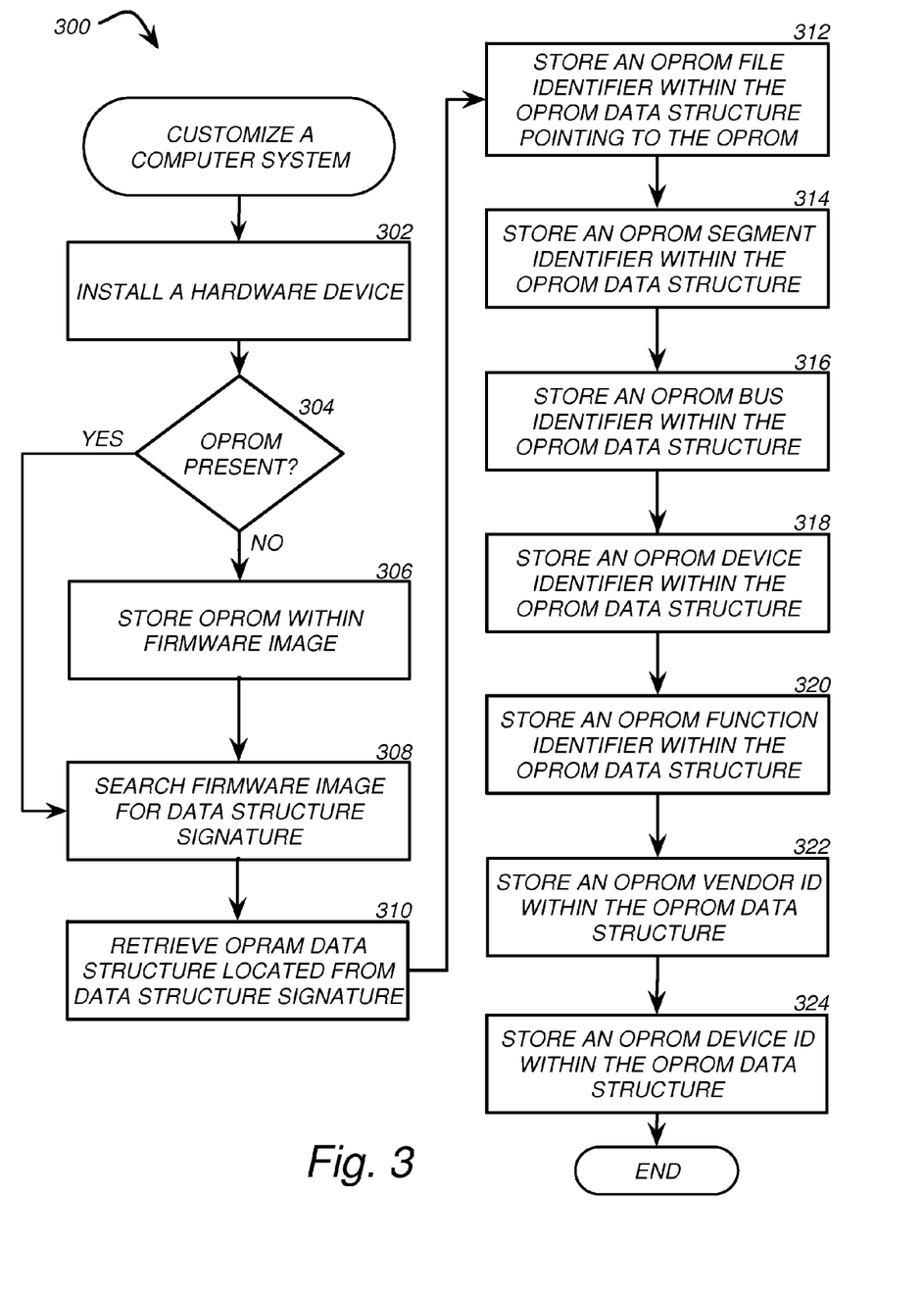
FIG. 3 is a flow diagram showing a process for customizing a computer system according to one embodiment.

Turning now to FIG. 3, an illustrative routine 300 will be described in detail for customizing a computer system. The logical operations of the various embodiments disclosed herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the embodiments described herein. Accordingly, the logical operations making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Routine 300 is performed primarily by application program 142. It should be understood that application 142 may be pre-programmed to execute the routine 300 without additional user input, or may provide one or more interfaces for receiving user input at any operation of the routine. The hardware device installation may be performed by a user or automated mechanical process. The routine 300 begins at operation 302, where a hardware device is installed within the computer system. The routine 300 continues to operation 304, where a determination is made as to whether an OPROM corresponding to the hardware device is present in the computer system firmware 144. If the hardware device resides on an expansion card, then the corresponding OPROM will likely be present on the expansion card as well. In this scenario, the routine 300 proceeds from operation 304 to operation 308. If the hardware device is installed on the computer system motherboard, then an OPROM must be stored within the firmware image 144 at operation 306 and the routine then proceeds to operation 308.

At operation 308, the firmware image 144 is searched for a unique data structure signature associated with the OPROM data structure 210. The OPROM data structure 210 located by the unique signature is retrieved at operation 310. The routine 300 continues from operation 310 to operation 312, where the OPROM file identifier that points to the corresponding OPROM is stored within the OPROM data structure 210. As described above, the OPROM file identifier may be a GUID assigned to the OPROM. The routine 300 continues to operation 314, where an OPROM segment identifier is stored within the OPROM data structure 210. From operation 314, the routine 300 proceeds to operation 316, wherein an OPROM bus identifier is stored within the OPROM data structure 210. An OPROM device identifier is stored at operation 318 and an OPROM function identifier is stored within the OPROM data structure 210 at operation 320. From operation 320, the routine continues to operation 322, where an OPROM vendor ID is stored within the OPROM data structure 210 and to operation 324, where an OPROM device ID is stored within the OPROM data structure and the routine ends. As discussed above, the OPROM data structure 210 version and size identifiers may also be updated after an OPROM entry is added or removed from the OPROM data structure.

It should be appreciated that embodiments described herein provide methods, apparatus, systems, and computer-readable media for customizing a computer system and computer system firmware. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A computer-implemented method for dynamically updating a computer system firmware image, the method comprising computer-implemented operations for:
    modifying, using a computer having a memory and a processor, a first option read only memory ("OPROM") corresponding to a first hardware device within the computer system firmware image having a plurality of OPROMs;
    searching, using the computer, the firmware image for a data structure signature stored within an OPROM data structure, the OPROM data structure having a plurality of stored OPROM identifiers corresponding to a plurality of hardware devices associated with a computer system;
    retrieving, using the computer, the OPROM data structure identified by the data structure signature; and
    modifying, using the computer, a first OPROM identifier within the OPROM data structure to reflect the modification of the first OPROM,
    wherein modifying the first OPROM comprises storing the first OPROM corresponding to an added hardware device to the firmware image with the plurality of OPROMs and wherein modifying the first OPROM identifier within the OPROM data structure comprises storing the first OPROM identifier corresponding to the first OPROM within a data field of the OPROM data structure.

2. The method of claim 1, wherein the first OPROM identifier comprises a pointer identifying a location of the first OPROM stored within the firmware image.

3. The method of claim 1, wherein adding the first OPROM comprises replacing a dummy entry stored in the firmware image with the first OPROM and wherein modifying the first OPROM identifier comprises replacing a dummy entry stored within the data field of the data structure with the first OPROM identifier.

4. The method of claim 1, wherein modifying the first OPROM comprises deleting the first OPROM corresponding to a removed hardware device from the firmware image and wherein modifying the first OPROM identifier within the OPROM data structure comprises replacing the first OPROM identifier corresponding to the first OPROM with a dummy entry.

5. The method of claim 2, wherein the pointer comprises a globally unique identifier ("GUID") associated with the first OPROM.

6. The method of claim 5, wherein the first OPROM identifier comprises a device identifier for identifying the first hardware device and a bus identifier corresponding to a bus communicatively connected to the first hardware device.

7. The method of claim 6, wherein the first OPROM identifier further comprises a vendor identifier, a segment identifier, and a device function number.

8. The method of claim 1, wherein each OPROM of the plurality of OPROMs corresponds to a different hardware device installed in the computer system.

9. A computer-implemented method for dynamically updating a computer system and computer system firmware image, the method comprising computer-implemented operations for comprising:
    installing, using a computer having a memory and a processor, a first hardware device within the computer system;
    determining, using a computer, whether a first OPROM corresponding to the first hardware device is present within the computer system;
    if the first OPROM is not present within the computer system, storing the first OPROM within a firmware image of the computer system;
    searching, using the computer, the firmware image for a data structure signature stored within an OPROM data structure, the OPROM data structure having a plurality of stored OPROM identifiers corresponding to a plurality of hardware devices associated with the computer system;
    retrieving, using the computer, the OPROM data structure located by the data structure signature; and
    storing a first OPROM identifier within the OPROM data structure corresponding to the first OPROM stored within the firmware image,
    wherein modifying the first OPROM comprises storing the first OPROM corresponding to an added hardware device to the firmware image with the plurality of OPROMs and wherein modifying the first OPROM identifier within the OPROM data structure comprises storing the first OPROM identifier corresponding to the first OPROM within a data field of the OPROM data structure.

10. The method of claim 9, wherein the first OPROM identifier comprises a pointer identifying a location of the first OPROM.

11. The method of claim 10, wherein the first hardware device comprises an expansion card installed within the computer system, wherein the first OPROM corresponding to the first hardware device is located on the expansion card, and wherein the pointer of the first OPROM identifier refers to the first OPROM located on the expansion card.

12. The method of claim 9, wherein the first hardware device comprises a chip installed on a motherboard of the computer system and wherein the method further comprises storing the first OPROM corresponding to the chip within the firmware image of the computer system as a result of determining that the first OPROM is not present within the computer system.

13. The method of claim 10, wherein the pointer comprises a globally unique identifier GUID associated with the first OPROM.

14. The method of claim 13, wherein the first OPROM identifier comprises a device identifier for identifying the first hardware device and a bus identifier corresponding to a bus communicatively connected to the first hardware device.

15. The method of claim 14, wherein the first OPROM identifier further comprises a vendor identifier, a segment identifier, and a device function number.

16. A non-transitory memory for storing a firmware image for creating a computer system firmware, the firmware image comprising:
- an OPROM corresponding to a hardware device associated with the computer system, and
- an OPROM data structure stored in the firmware image, the OPROM data structure having an array of data fields populated by a data structure signature identifying the OPROM data structure,
- an OPROM identifier comprising identifying information relating to the OPROM, and a pointer identifying a location of the OPROM, and
- wherein modifying the first OPROM comprises storing the first OPROM corresponding to an added hardware device to the firmware image with the plurality of OPROMs and wherein modifying the first OPROM identifier within the OPROM data structure comprises storing the first OPROM identifier corresponding to the first OPROM within a data field of the OPROM data structure.

17. The non-transitory memory of claim 16, wherein the pointer comprises a GUID associated with the OPROM.

18. The non-transitory memory of claim 16, wherein the identifying information relating to the OPROM comprises a device identifier for identifying the hardware device and a bus identifier corresponding to a bus communicatively connected to the hardware device.

19. The non-transitory memory of claim 18, wherein the identifying information relating to the OPROM further comprises a vendor identifier, a segment identifier, and a device function number.

* * * * *